United States Patent
Haener

[15] 3,681,631
[45] Aug. 1, 1972

[54] GENERATOR OF ELECTRICAL SIGNAL PULSES

[72] Inventor: Franz Haener, Mississauga, Ontario, Canada

[73] Assignee: Neptune Meters Limited, West Toronto, Ontario, Canada

[22] Filed: July 19, 1971

[21] Appl. No.: 163,964

[52] U.S. Cl..................................310/37, 310/80
[51] Int. Cl..............................................H02k 35/02
[58] Field of Search..................310/36–39, 152, 310/156, 80, 83

[56] References Cited

UNITED STATES PATENTS

| | | | |
|---|---|---|---|
| 2,135,843 | 11/1938 | Pye | 310/36 |
| 2,872,627 | 2/1959 | Buchtenkirchy | 310/36 X |
| 3,118,075 | 1/1964 | Dunn et al. | 310/37 X |
| 3,339,093 | 8/1967 | Beers | 310/36 X |
| 3,379,906 | 4/1968 | Spohr | 310/80 X |

*Primary Examiner*—D. F. Duggan
*Attorney*—Lester W. Clark et al.

[57] ABSTRACT

This generator of electrical signal pulses is intended for use in a remote meter reading system in which the generator is driven by a meter, e.g., a water meter, and produces a single pulse upon the completion of a predetermined number of revolutions of the meter rotor.

12 Claims, 14 Drawing Figures

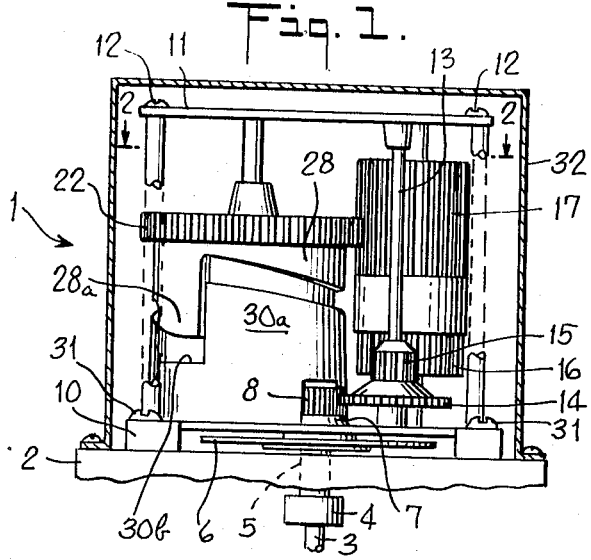
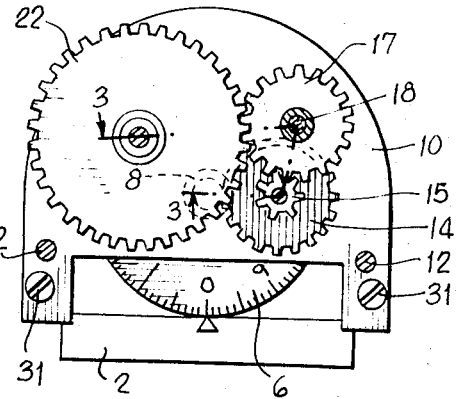
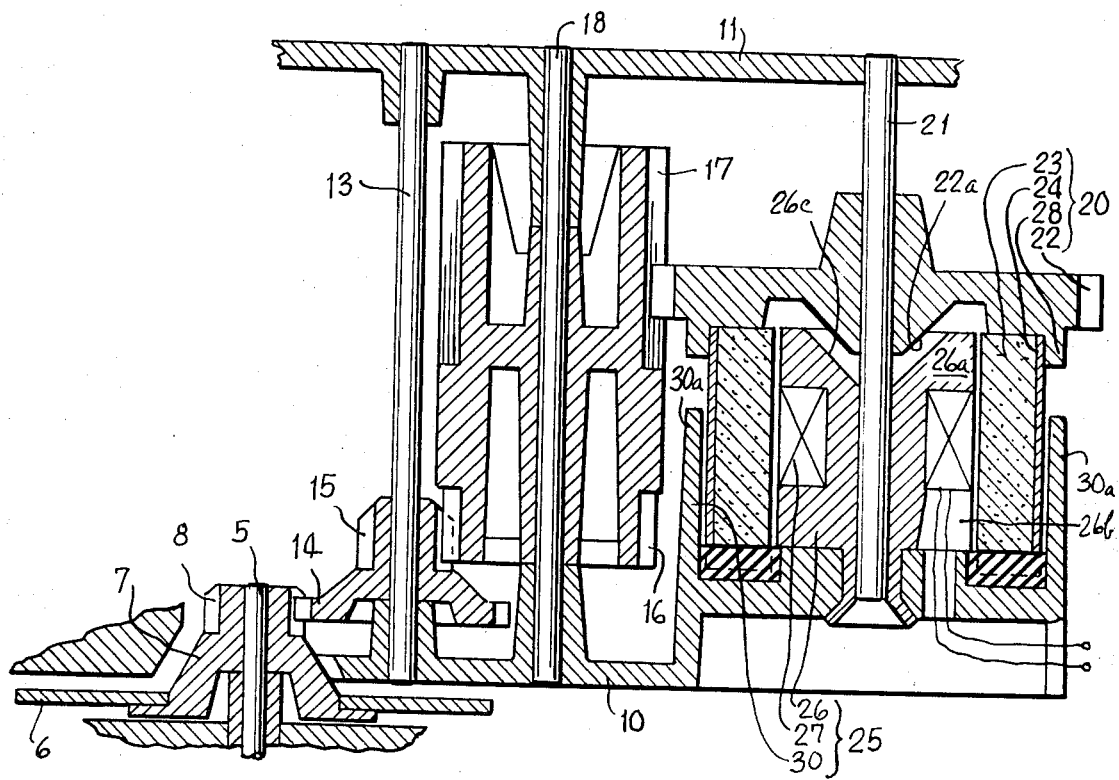

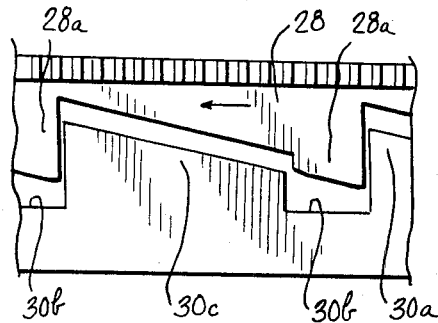
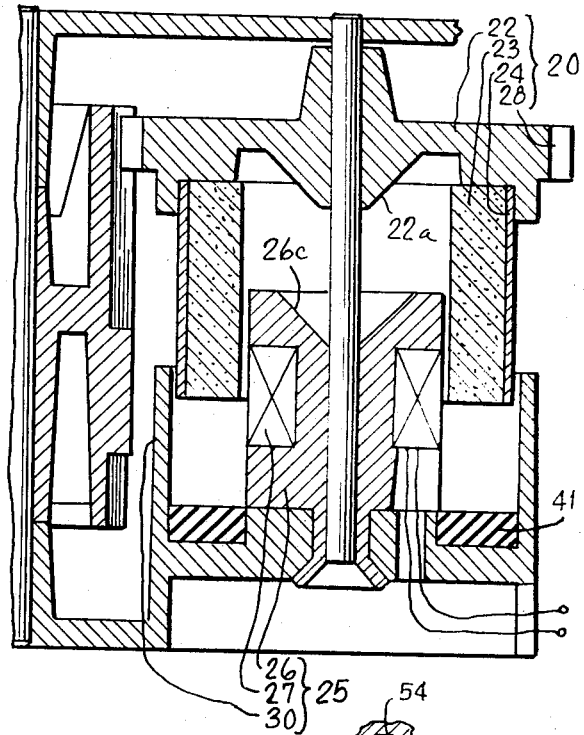
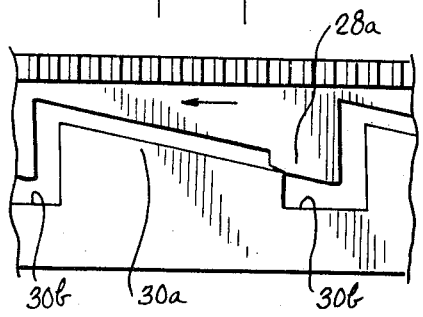
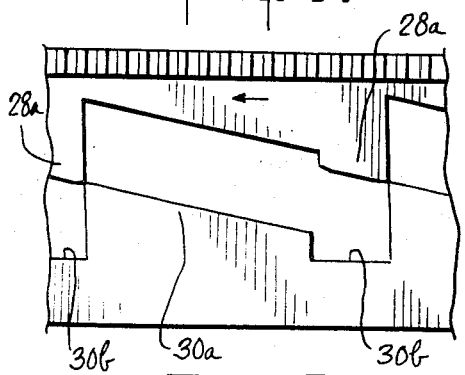
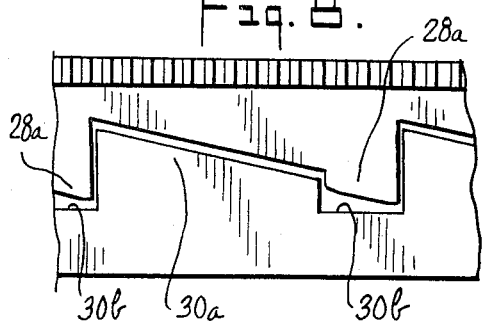
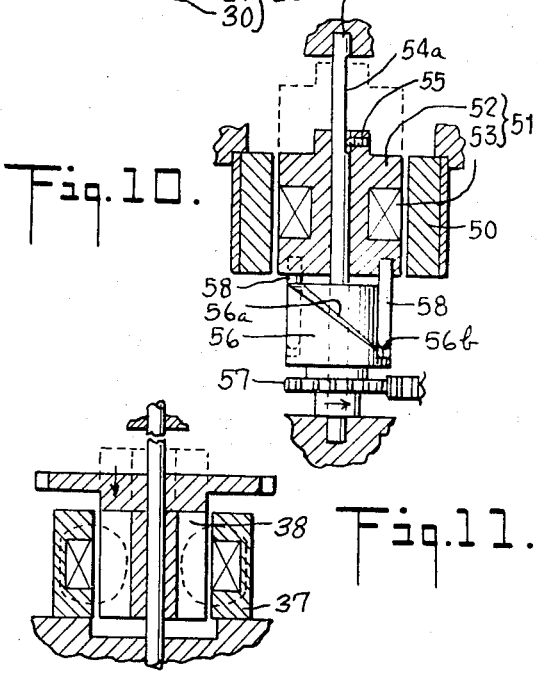
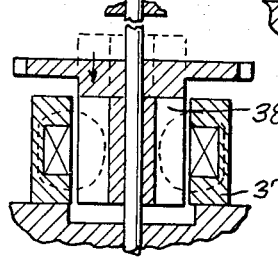

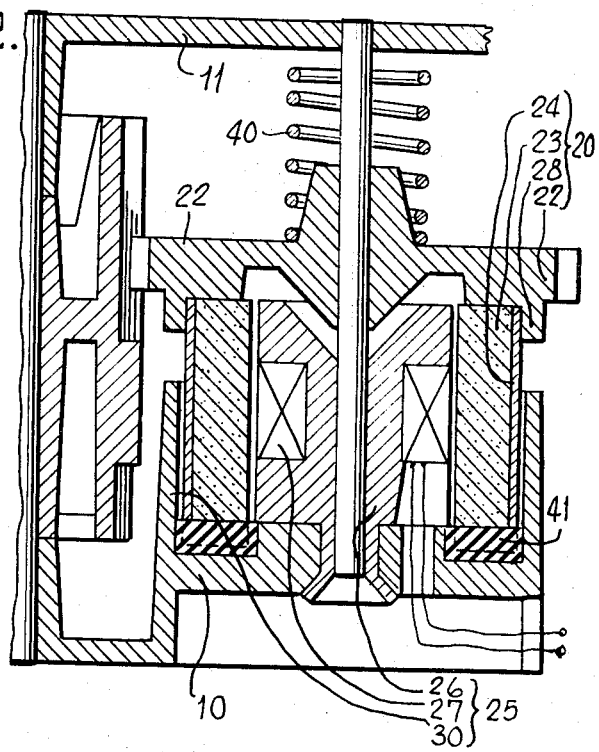
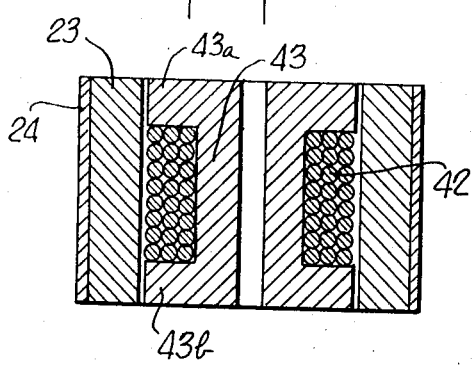
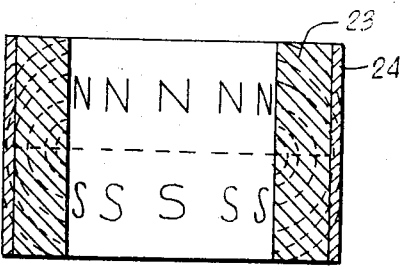
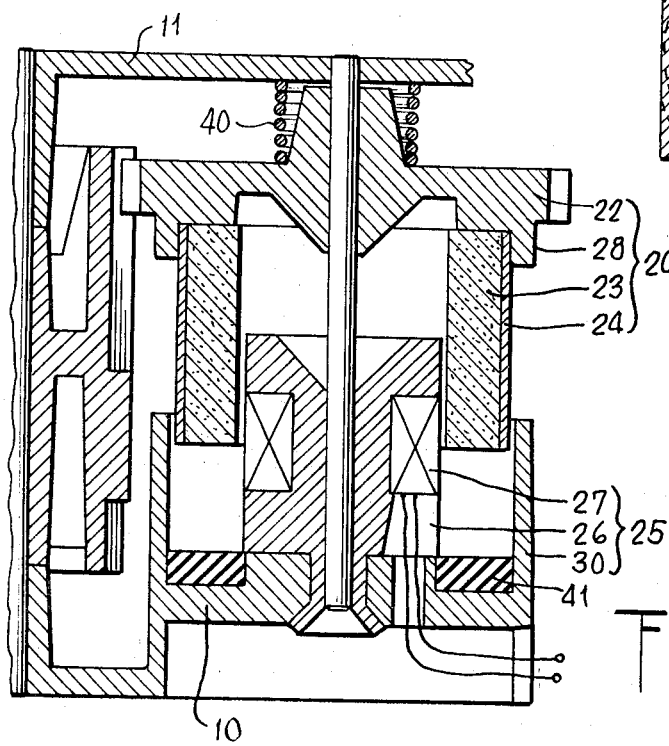

GENERATOR OF ELECTRICAL SIGNAL PULSES

The generator shown includes a permanent magnet and a concentric stationary coil, mounted for relative axial translation. A cooperating cam element and a cam follower element are connected respectively to the magnet and to the coil, and follow their axial movements. One of the cam elements is rotated by the rotation of the meter, through a gear drive. As the meter turns, the cam and follower cause relative axial movement between the magnet and the magnet core, away from their rest positions, being driven slowly by the meter. Substantially no current is induced in the coil at this time. When the cam follower reaches the end of a helical riser on the cam, the follower drops off the riser of the cam and into a recess on the follower so that the magnet is restored to its rest position, with a slight amount of overtravel. During this rapid return, a sharp pulse of electrical current is produced in the coil and is delivered to appropriate pulse counting mechanism located remotely from the meter.

BRIEF SUMMARY OF THE INVENTION

The pulse generator of the invention comprises a permanent magnet assembly and a magnetic circuit assembly. Both assemblies are generally cylindrical and concentric, and they are mounted for relative axial movement. The magnet assembly has two poles, spaced apart axially and directed radially. The magnetic circuit assembly has two flanges spaced apart axially and directed radially so as to be opposite to the poles when the assemblies are in their rest position. One of the assemblies carries a cylindrical cam element and the other assembly carries a cam follower element which cooperates with the cam. The cam illustrated has two helical riser surfaces spaced 180° apart and separated by recesses which extend below the bottoms of the risers. The follower illustrated has two projections which cooperate with the cams. At least the cam element of one assembly is rotatable, and the other cam element is fixed against rotation. In most modifications, one entire assembly rotates with its cam element.

When the assemblies are in their rest positions, the followers are axially aligned with the bottoms of the risers, so that upon relative rotation of the cam and follower elements, the followers readily engage the riser surfaces, and the movable assembly is driven axially of the generator away from its rest position. When the followers reach the ends of the helical risers and become aligned with the adjacent recesses, the movable assembly returns quickly to its rest position, generating a pulse in the coil, which is transmitted to a suitable pulse counting mechanism.

IN THE DRAWINGS

FIG. 1 is an elevational view of a pulse generator embodying the invention, with a cover shown in cross-section.

FIG. 2 is a cross-sectional view on the line 2—2 of FIG. 1.

FIG. 3 is an enlarged and developed view taken along the line 3—3 of FIG. 2, showing the gear train in a single plane, and showing the movable magnet assembly in rest position.

FIG. 4 is a fragmentary view similar to a part of FIG. 3, but showing the magnet assembly at its maximum displacement from rest position.

FIG. 5 is a fragmentary, developed view of the cam and follower structure, with the parts in their rest positions.

FIG. 6 is a view similar to FIG. 5, but showing the cam follower starting up the riser of the cam.

FIG. 7 is a view similar to FIGS. 5 and 6, showing the follower about to drop off the top of the riser.

FIG. 8 is a view similar to FIG. 5, showing the position of the follower during overtravel when it has just dropped off the riser.

FIG. 9 is a cross-sectional view of the permanent magnet, showing the direction of magnetization and the arrangement of the poles.

FIG. 10 is a fragmentary view, showing a modification.

FIG. 11 is a fragmentary view showing still another modification.

FIG. 12 is a view similar to FIG. 3, showing a modification with the parts in rest position.

FIG. 13 is a view similar to FIG. 4, but showing the modification of FIG. 12.

FIG. 14 is a view of a magnetizing coil which may be used to produce the magnet of FIG. 9.

FIGS. 1-9

The pulse generator of the invention is shown generally at 1 and is mounted on the top plate 2 of the register of a water meter (not shown). The output shaft 3 of the meter register drives a shaft 5 through a one-way clutch 4. The shaft 5 extends above the top of the register box 2 and carries a calibration dial 6, a dial locating hub 7 and a pinion gear 8. The clutch 4 may alternatively be incorporated in the generator 1 at a convenient location.

The pulse generator comprises a base plate 10 and a top plate 11, held together by a pair of through bolts 12. A shaft 13 is fixed in the base plate 10 and the top plate 11 and rotatably carries a gear 14 cooperating with the pinion 8 and a pinion 15 fixed to gear 14 and cooperating with a gear 16 which is one of a pair of twin gears 16, 17 rotatably mounted on a shft 18, fixed at its ends in the base plate 10 and the top plate 11.

A permanent magnet assembly 20 is mounted for rotation and for vertical sliding motion on a shaft 21. The assembly 20 includes a gear 22, meshing with the gearing 17, and an annular permanent magnet 23 fixed on the gear 22 and surrounded by a mild steel shell 24. As shown in FIG. 9, the permanent magnet 23 is magnetized so that it has two radially directed annularly distributed poles indicated by the letters N and S in FIG. 9. The two poles are spaced apart along the axis of the magnet assembly and are directed radially of the axis.

The permanent magnet 23 is preferably a ceramic magnet. The magnet material can either be a non-oriented or a partially oriented grade, although the latter is preferred. The mild steel shell 24 can be omitted, but is required in order to obtain the strongest magnetic field possible with a given magnet.

The permanent magnet assembly also includes a cylindrical cam follower 28, located just outside the periphery of the permanent magnet shell 24 and fixed to or preferably integral with the gear 22, as shown. The cam follower 28 includes a pair of downwardly projecting follower members 28a.

The permanent magnet assembly encircles a magnetic circuit assembly 25, which includes a core 26 having upper and lower flanges 26a and 26b, and a coil 27 received between the flanges. The coil 27 is provided with appropriate electrical connections which may extend through openings in the bottom flange 26b and the base plate 10, as shown.

The magnetic circuit assembly 25 includes a cylindrical cam 30, which may be fixed to the base 10, as shown, and includes a pair of upwardly extending helical risers 30a separated by recesses 30b.

The magnet 23 should be strong enough so that when the two assemblies are brought together in the position shown in FIG. 3, the magnet assembly 20 will assume a rest position where it is supported solely by the attraction between its poles and the flanges 26a and 26b, without engaging any underlying part.

Referring to FIG. 5, it may be seen that at this time the lower ends of the projections 28a of the cam follower 28 are above the bottoms of the helical risers 30a.

As the meter starts to run, the magnet assembly 20 is rotated, and the cam followers 28a move toward the left in FIG. 5, engaging the helical risers 30a, as shown in FIG. 6. The cam assembly is thereby driven axially of the magnetic circuit assembly 25, but the motion is so slow that any potential generated in the coil 27 is not sufficient to produce a substantial output signal. When the projections 28a reach the tops of the risers 30a, as shown in FIG. 7, the magnet assembly is attracted by the cooperation of the magnet poles and the flanges 26a and 26b, and moves through an output stroke from its position of maximum displacement back to the rest position. This output stroke takes place suddenly, and produces a rapid change in the magnetic flux through the coil 27, thereby producing an output pulse signal which indicates that the driving meter has turned far enough to rotate the magnet assembly 20 through one-half revolution.

When the magnetic assembly moves back to its rest position suddenly, it moves due to its own inertia beyond that rest position with a slight amount of overtravel, as shown in FIG. 8. It is desirable to allow a slight amount of overtravel, because if the magnetic assembly were to be stopped abruptly in its rest position, each output pulse would be accompanied by a substantial impact. However, it is necessary to limit the overtravel, in order to make sure that the overtravel does not continue long enough to produce a reverse output signal in the coil 27, of sufficient magnitude to operate the pulse counting register to which the coil is connected. An overtravel equal to about 25 percent of the stroke (i.e., the axial distance between rest position and maximum displacement) is considered to be optimum, for a generator to be used with an electromechanical counter.

The overtravel is limited by engagement of a conical projection 22a on the underside of gear 22, with a mating conical recess 26c in the upper surface of core 26. These surfaces take the impacts, if any, at the end of the overtravel, so that there is no impact on any of the cam and follower surfaces, or on the bottom of the magnet 23. The stress due to any impact is distributed over the entire area of the mating conical surfaces.

The base plate 10, which supports the entire generator assembly, is fastened to the top plate of the meter register by means of two screws 31. A cover 32 encloses the generator assembly 1 on the top of the meter register.

FIG. 10

This figure illustrates a modification of the invention in which an annular cylindrical magnet 50 is fixed against both rotation and axial translation. A magnetic circuit assembly 51 including a core 52 and a coil 53 is mounted on a shaft 54 for axial translation inside the permanent magnet 50. The magnetic circuit assembly 51 is held against rotation by means of a set screw 55 which engages a flat 54a on the shaft 54. A cylindrical cam 56 is fixed to a gear 57 which is driven by the rotor of a meter. The cam 56 has two helical risers 56a separated by recesses 56b. A pair of pins 58 serve as followers for the cam 56. The pins 58 are fixed at diametrically opposite points on the bottom of the magnetic circuit assembly 51, and extend parallel to the shaft 54.

The apparatus of FIG. 10 functions in a manner generally similar to that described in connection with FIGS. 1–9, above. As the meter turns, the gear 57 and cam 56 rotate in the direction of the arrow shown on the hub of gear 57. The cam follower pins 58 are driven axially upward, as viewed in FIG. 10, moving the magnet circuit assembly 51 from the full line position to the dotted line position. When the pins reach the top of the helical risers 56a, they drop into the recesses 56b. This motion takes place rapidly, and generates an impulse of substantial potential in the coil 53. The counting of such impulses by a remote indicator may be used as a counter of the number of turns of the meter shaft.

FIG. 11

This figure illustrates a modification of the invention in which a magnetic circuit assembly 37 is fixed in position outside a magnet assembly 38, the latter being rotatable and slidable within the magnetic circuit assembly 37.

It should be realized that in any given embodiment of the invention either one of the two assemblies may be stationary and the other movable, and that either one of the two assemblies may be located inside the other. The outer assembly is always annular in cross-section.

Furthermore, in any embodiment of the invention, the helical cam surfaces may be placed on one assembly and the cam follower structures on the other assembly. It is in fact debatable which of the two structures should be called a cam and which a cam follower, but it makes no difference as to the operation of the generator.

FIGS. 12–13

These figures illustate a modification of the invention, in which a coil spring 40 is added between the top gear 22 and the under side of the top plate 11. Note that when the parts are in the rest position, the top of the coil spring is free of the top plate 11. In other words, the axial length of the unstressed coil spring is less than the total distance between the top of the gear 22 and the top plate 11. As the gear 22 is driven upwardly by operation of the cam, the top end of the spring 40 engages the top plate 11 and the spring is thereafter compressed as the operation of the generator proceeds. When the cam follower reaches the top of the risers, the spring 40 aids in accelerating the magnet assembly downwardly toward its rest position, thereby producing a greater velocity of the magnet assembly, and hence a greater rate of change of magnetic flux in the coil 27, and consequently a greater output signal.

The modification of FIGS. 12 and 13 is also changed with respect to the modifications of FIGS. 3 and 4 in that a resilient stop 41 has been added on top of the plate 10, under the magnet 23. One purpose of the stop is to limit the overtravel of the magnet during its output stroke, and thereby to limit the reverse polarity output pulse which might otherwise be generated in the case of a large overtravel. Furthermore the stop 41, if constructed of resilient impact absorbing material, such as sponge rubber, reduces the impact noise created when the magnet assembly reaches the bottom of its travel.

Instead of placing the stop 41 on the plate 30 under the magnet, it could alternatively be placed between the cone 22a and the conical recess 26c in the top of the core 26. If so placed, the stop could be bonded either to the movable assembly 20, or the stationary assembly 25. Alternatively, the stop 41 could be bonded to the bottom of the magnet, instead of being received in a recess in the top of the plate 10, as shown. Such a stop could be provided in the embodiment of FIGS. 3 and 4.

FIG. 14

This figure illustrates a simple form of magnetizing coil which will produce in the magnet 23, the magnetic pole pattern described in FIG. 9. The magnetizing coil is shown at 42 and encircles a cylindrical core 43 having end flanges 43a and 43b. The magnet 23 to be magnetized is placed around the coil 42 and core 43, as shown. The coil 42 is then pulsed with a heavy current of short duration, preferably from a capacitor discharge system, as is common in the magnetizing art. Such a pulse may readily be made effective to magnetize permanently the magnet 23, with the pole array shown in FIG. 9.

Although the embodiments illustrated have been described in a particular orientation with respect to the vertical, the generator of the invention is not substantially affected by its vertical orientation, and can operate in either a horizontal position or a position inverted as compared to those shown in the drawings.

I claim:

1. A generator of electrical signals, comprising:
   a. a cylindrical permanent magnet assembly having two poles of opposite polarity spaced apart along the axis of the assembly and directed radially of said axis;
   b. a cylindrical magnetic circuit assembly concentric with the magnet assembly and comprising:
      1. two radially extending flanges spaced apart along said axis by a distance substantially equal to the axial spacing between the poles; and
      2. an axially extending core connecting said flanges;
   c. means supporting the magnet assembly and the magnetic circuit assembly for relative axial movement;
   d. means including said magnet assembly biasing the assemblies toward rest positions in which the poles are radially aligned with the flanges;
   e. means holding one of said assemblies against axial movement;
   f. means for driving the other of said assemblies away from its rest position for a predetermined distance and then releasing it for restoration by the biasing means to its rest position; and
   g. a coil encircling said axis and having an electrical signal potential induced therein during relative axial movement of said two assemblies.

2. A generator as in claim 1, in which said driving means moves the other assembly relatively slowly away from its rest position, and the biasing means moves the assembly rapidly back toward its rest position, so that said coil produces a substantially larger signal during the restoration of the other assembly to its rest position than during its movement away from that position.

3. A generator as defined in claim 2, in which said driving means comprises:
   a. a first cylindrical cam element encircling said axis and connected to said other assembly for axial movement therewith;
   b. a second cam element encircling the axis and connected to said one assembly and cooperating with the first cam element; and
   c. means holding one of the cam elements against rotation; and
   d. means for rotating the other cam element so that the cam elements engage and produce relative axial movement of the two assemblies.

4. A generator as in claim 3, in which:
   a. one of the cam elements has circularly spaced helical risers separated by axially extending recesses;
   b. the other cam element includes circularly spaced projections which engage the helical risers during rotation of said driven assembly, and which becomes aligned with said recesses after passing beyond the high ends of the risers, whereupon said biasing means becomes effective to restore the driven assembly rapidly to its rest position and thereby to generate a substantial signal potential in said coil.

5. A generator as in claim 3, in which the drive means includes a peripheral gear on the other assembly.

6. A generator as in claim 1, in which the coil is supported on the magnetic circuit assembly between the flanges.

7. A generator as in claim 1, in which said biasing means includes a spring compressed by said other assembly as it moves through said predetermined distance.

8. A generator as in claim 7, in which said spring is compressed only during the latter part of the travel of said other assembly through said predetermined distance.

9. A generator as in claim 1, in which said driving means permits limited overtravel of the other assembly during its restoration to its rest position.

10. A generator as in claim 9, in which said overtravel is limited to about 25 percent of the distance between the position of maximum displacement and the rest position.

11. A generator as in claim 9, including resilient stop means for limiting said overtravel.

12. A generator as in claim 9, in which said assemblies have mating conical surfaces for limiting the overtravel.

* * * * *